United States Patent
Drummond et al.

(10) Patent No.: US 6,691,156 B1
(45) Date of Patent: Feb. 10, 2004

(54) METHOD FOR RESTRICTING DELIVERY OF UNSOLICITED E-MAIL

(75) Inventors: Kirk Drummond, Austin, TX (US); Duane Kimbell Fields, Austin, TX (US); Thomas Preston Gregg, Austin, TX (US); Mark Andrew Kolb, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,574

(22) Filed: Mar. 10, 2000

(51) Int. Cl.[7] .............................................. G06F 15/16
(52) U.S. Cl. .................... 709/206; 709/203; 709/207
(58) Field of Search ................................ 709/202, 203, 709/204, 206, 207

(56) References Cited

U.S. PATENT DOCUMENTS

| | | | |
|---|---|---|---|
| 5,619,648 A | 4/1997 | Canale et al. ............ | 395/200.01 |
| 5,826,022 A | 10/1998 | Nielsen ................. | 395/200.36 |
| 5,978,837 A | 11/1999 | Foladare et al. ............ | 709/207 |
| 5,999,932 A * | 12/1999 | Paul ............................ | 709/206 |
| 6,023,723 A | 2/2000 | McCormick et al. ........ | 709/206 |
| 6,029,164 A | 2/2000 | Birrell et al. ................. | 707/3 |
| 6,029,195 A | 2/2000 | Herz .......................... | 709/219 |
| 6,112,227 A * | 8/2000 | Heiner ........................ | 709/202 |
| 6,199,102 B1 * | 3/2001 | Cobb .......................... | 709/204 |
| 6,249,805 B1 * | 6/2001 | Fleming, III ................ | 709/206 |
| 6,460,050 B1 * | 10/2002 | Pace et al. ................... | 709/203 |

* cited by examiner

*Primary Examiner*—Zarni Maung
(74) *Attorney, Agent, or Firm*—Duke W. Yee; Jeffrey S. LaBaw; Wayne P. Bailey

(57) ABSTRACT

A method and computer program operative in an e-mail server for reducing unsolicited e-mail in an enterprise computing environment. According to the invention, e-mail is accepted for delivery to e-mail clients only if it is from an address that has been verified by an e-mail server and/or approved by a recipient. When an e-mail from a particular address is received at the e-mail server for the first time, the server automatically issues an e-mail to the address to request that the sender verify the authenticity of the original message. If a return acknowledgement is received within a given time period, the e-mail is deemed to be authentic and delivered to its intended recipient within the enterprise. Mail messages from previously-verified addresses need not be rechecked.

3 Claims, 3 Drawing Sheets

METHOD FOR RESTRICTING DELIVERY OF UNSOLICITED E-MAIL

BACKGROUND OF THE INVENTION

1. Technical Field

This invention relates generally to information delivery in a computer network. More particularly, the invention relates to techniques for restricting delivery of unsolicited e-mail, commonly known as "spam."

2. Description of the Related Art

E-mail has become the communication method of choice throughout the business world as well as for the general public. In a typical enterprise environment, a mail server (such as UNIX SendMail) has a local mail delivery agent or client (typically . . . /bin/mail on UNIX systems) that stores an incoming e-mail on a local file system and delivers it to an end user via POP, IMAP or a command line program. Such agents typically provide the basic functionality of logging in an e-mail message and copying that message to a client machine's mail spool. Internet-based client-server messaging systems include, for example, Lotus Notes, which provides e-mail, calendaring, group scheduling, Web access and information management, integrated in an easy-to-use and customizable environment.

The rapid increase in the number of users of the Internet has made e-mail an attractive advertising medium. Unfortunately, however, e-mail is now frequently used as the medium for widespread marketing broadcasts of messages to large number of e-mail addresses. Large service providers and corporations are particularly susceptible to this practice, which is commonly known as spamming.

The desire to reduce spam has led to both regulatory and technical solutions. Several states have passed legislation that ban the practice of sending spam e-mail and impose criminal sanctions for violations. A summary of these regulations is available at the following URL: http://www.sork.com/spamlaws/state/summary.html#ok. Technical solutions include a number of techniques. The most common one is to filter unsolicited e-mail by blocking e-mails from particular e-mail addresses that originate such messages. This approach, however, is vulnerable to rapid changes in the source of the unsolicited e-mail, which is relatively easy because most spam is generated by automated means. Such approaches also typically require the set up and maintenance of a complex filtering mechanism.

Some e-mail clients, e.g., Eudora Pro, allow the end user to set filters that can be set to scan incoming e-mail and then perform a designated function with that e-mail. Such programs have been set up to scan for messages that do not contain a user's personal e-mail address and to filter such messages into a "hold for review" mailbox. By transferring messages that are not personally addressed, the system can be programmed to attempt to filter out spam.

Another approach to filtering unsolicited e-mail is described in U.S. Pat. No. 5,999,932 to Paul. In this patent, a user creates an inclusion list including identification data for identifying e-mail desired by the user. Data from one or more fields of incoming e-mail are compared with the identification data stored in the inclusion list. If no match is detected, the system performs at least one heuristic process to determine whether the e-mail may be of interest to the user. If the e-mail message does not satisfy any heuristic criteria, the message may be marked with a display code, such as "junk."

Yet another approach to the problem of spam is provided by products that attach digital signatures to outgoing mail and that then monitor incoming mail looking for valid signatures. One such product is available commercially as AuthentiMail™, from Omnipoint Technologies, Inc. This system uses an intermediary server between the external Internet and an internal mail server. Before an e-mail is delivered to the Internet, a signature is attached to the message to protect the user's e-mail address. If a third party server tries to forward the message or compile the sender's name in a mailing list, however, the signature is invalidated to prevent spamming.

While the above-described techniques do prevent and/or attempt to minimize the harmful effects of spam, they require complex and costly software and/or servers that are difficult to set up and maintain.

There remains a need for a simple, yet effective way of restricting unsolicited e-mail within an enterprise e-mail environment. The present invention addresses this need.

BRIEF SUMMARY OF THE INVENTION

The present invention is a method and computer program operative in an e-mail server for reducing unsolicited e-mail in an enterprise computing environment. According to the invention, e-mail is accepted for delivery to e-mail clients only if it is from an address that has been verified by an e-mail server and/or approved by a recipient. When an e-mail from a particular address is received at the e-mail server for the first time, the server automatically issues an e-mail to the address to request that the sender verify the authenticity of the original message. If a return acknowledgement is received within a given time period, the e-mail is deemed to be acceptable and delivered to its intended recipient within the enterprise. Mail messages from previously-verified addresses need not be rechecked.

According to a preferred embodiment, a list of approved addresses is maintained at the e-mail server for each user, preferably without requiring the user's interaction. The address of any outbound e-mail sent from an e-mail client is automatically added to the user's approved address list. An inbound e-mail having a sending address that is seen for the first time is delivered to a holding queue instead of being delivered to the intended recipient. The server responds to the inbound e-mail by issuing an e-mail back to the unknown sending address, requesting a return acknowledgement. If the acknowledgement is received within a given time period, the e-mail is released from the holding queue and delivered to the intended recipient. If, however, an acknowledgement is not received within the given time period, it is flushed from the holding queue. Using this method, spam e-mail accumulates in the user's holding queue instead of being delivered to the user's inbox because spamming is typically accomplished by automated routines that cannot or do not respond to the e-mail's server's request for acknowledgement.

In a representative embodiment, a method of restricting unsolicited e-mail is responsive to receipt of an e-mail for determining whether a sending address associated with the e-mail is on a given list of approved addresses. If not, an e-mail is issued to the sending address requesting a return acknowledgement. The e-mail is then directed to a holding queue pending receipt of the return acknowledgement. The e-mail is deleted from the holding queue if the return acknowledgement is not received within a given time period, indicating that it is likely a spam message. On the contrary, the e-mail is released from the holding queue upon receipt of the return acknowledgement within the given time period. In such case, the sending address is then added to the given list of approved addresses and is not rechecked if a subsequent e-mail (originating from the same address) is received at the e-mail server.

If desired, once an e-mail having a particular sending address has been approved for delivery to an intended recipient and the sending address added to the approved address list, any e-mail that originates from the same domain may also be added to address list.

According to a more particular aspect of the invention, an e-mail server includes a mail transport agent for receiving inbound e-mail intended for a given e-mail client, and an anti-spamming agent associated with the mail transport agent for blocking unsolicited e-mail. The anti-spamming agent includes code for generating a list of approved addresses for each e-mail client, and code responsive to receipt of an e-mail for a particular e-mail client for determining whether a sending address associated with the e-mail is on the e-mail client's given list of approved address. The anti-spamming agent also includes code responsive to a negative determination for issuing an e-mail back to the sending address requesting a return acknowledgement, and code for directing the e-mail to a holding queue for the e-mail client pending receipt of the return acknowledgement.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
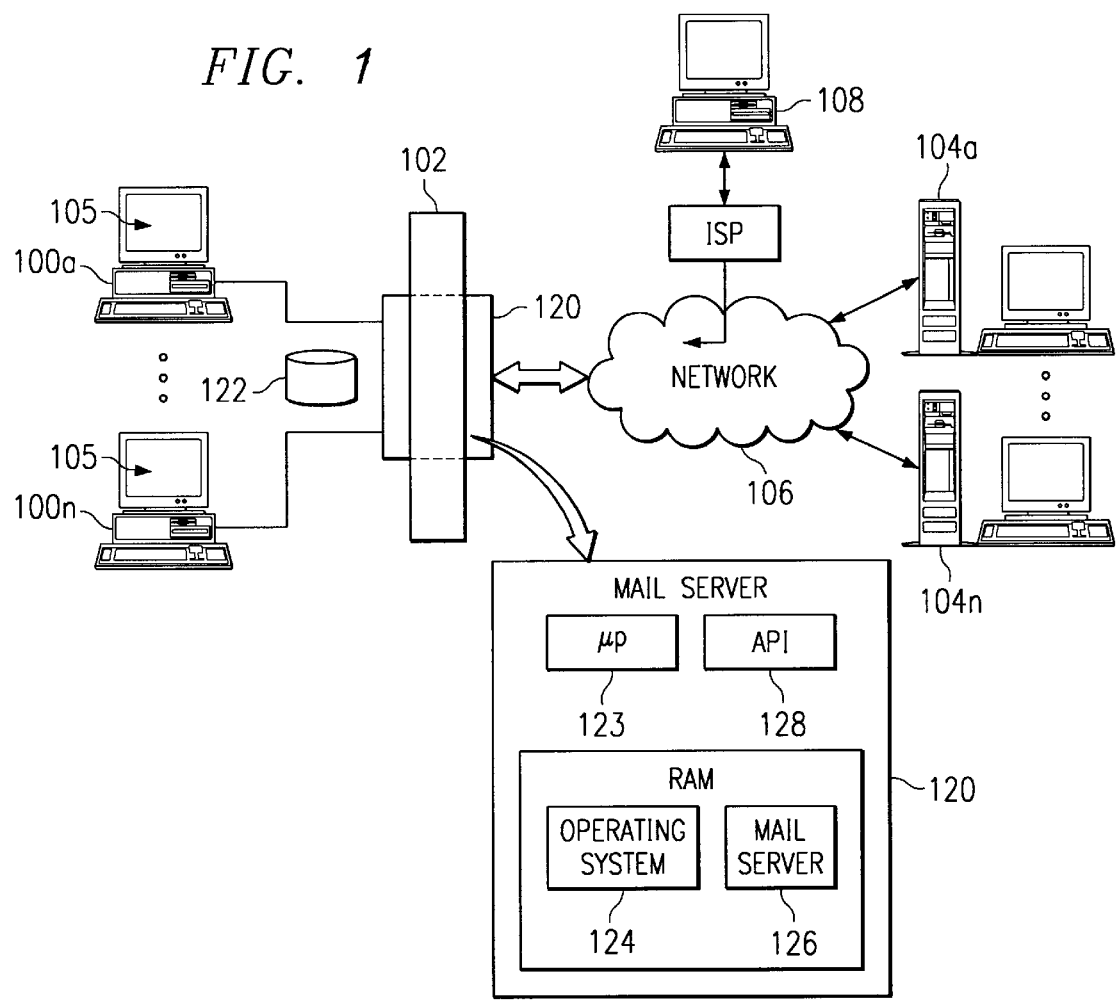
FIG. 1 is a representative SMTP-based client-server system in which the present invention is implemented.

By way of background, a known Internet client-server system is implemented is and illustrated in FIG. 1. In this system, a set of client machines 100a–100n are connected behind a network firewall 102 within an enterprise environment. Each client machine has the capability of connecting to a set of web servers 104a–104n over network 106 in a known manner. Network 106 typically includes other servers for control of domain name resolution, routing and other control functions. The network 106 is the Internet, an Internet, or any other known network. To this end, each client typically includes a suite of programs that enable a user of the client to obtain known Internet services including one-to-one messaging (e-mail), one-to-many messaging (bulletin board), file transfer, and web browsing. Thus, a user of client 108 outside the firewall 102 may communicate with one of the clients 100 inside the firewall. A representative client includes a Simple Mail Transport Protocol (SMTP) e-mail client 105 such as Lotus Notes, Microsoft Outlook, or the like. E-mail clients 105 cooperate with mail server 120 in a known manner. A representative mail server 120 includes a local mail delivery agent that stores incoming e-mail on a local file system 122 and delivers it to an end user (e.g., via POP, IMAP or a command line program). In the Internet paradigm, a network path to a resource (e.g., a server) is identified by a so-called Uniform Resource Locator (URL).

A representative mail server 120 is an IBM Domino server comprising a processor 123, an operating system 124 and a mail server program 126. Mail server program is a local mail delivery agent, as previously noted. The server 120 may include an Application Programming Interface (API) 128 that provides extensions to enable application developers to extend and/or customize the core functionality thereof through software programs including plug-ins, servlets, and the like.

A representative client is a personal computer, notebook computer, Internet appliance or pervasive computing device (e.g., a PDA or palm computer) that is x86-, Pentium-PowerPC®- or RISC-based. The client includes an operating system such as IBM® OS/2®, Microsoft Windows, Microsoft Windows NT, Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications. The client also includes an e-mail client, such as Lotus Notes, Microsoft Outlook, or the like, to manage e-mail communications.

Figure 2:
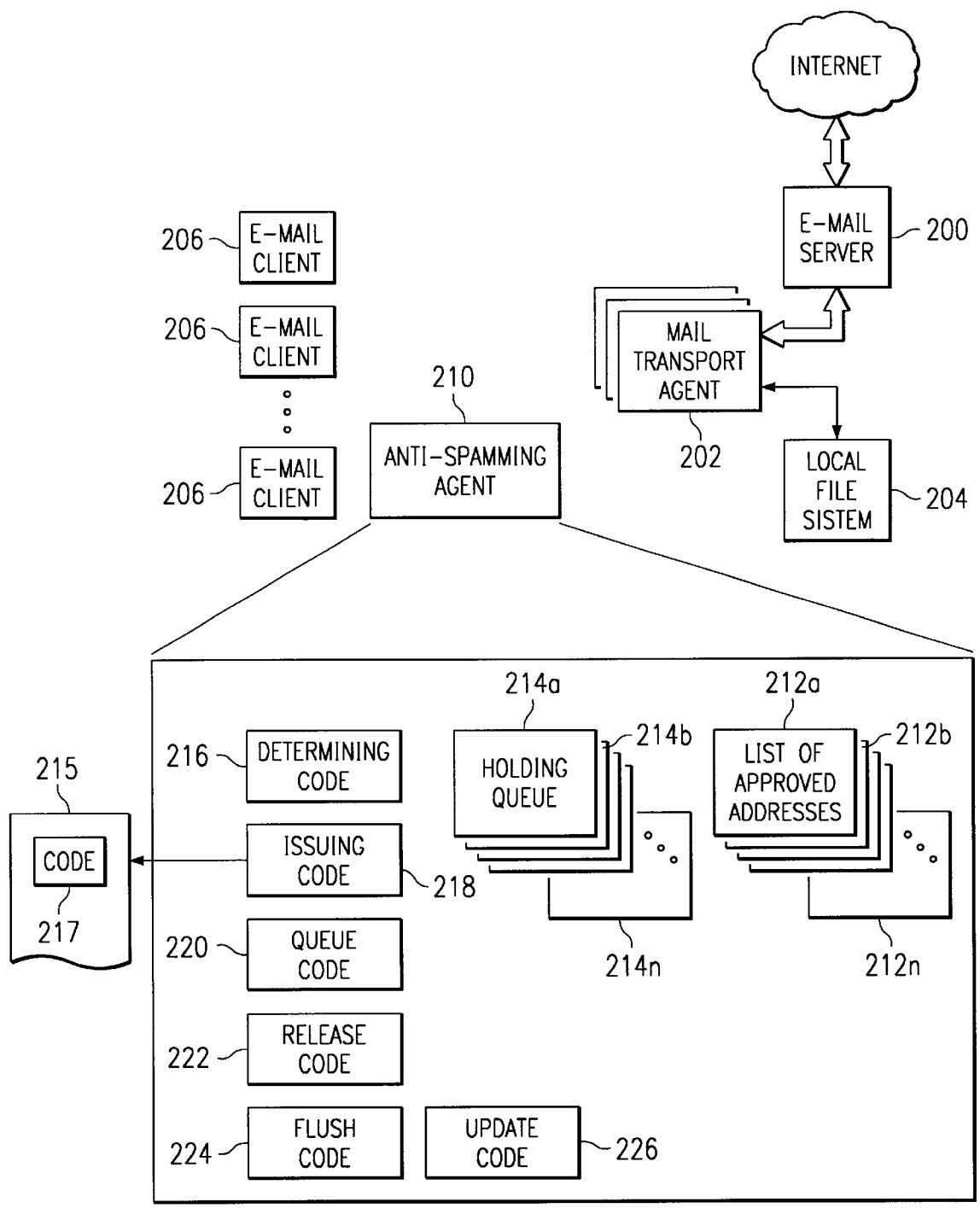
FIG. 2 is a block diagram on an e-mail server that incorporates the functionality of the present invention.

FIG. 2 is a block diagram of the inventive e-mail server 200 of the present invention. E-mail server 200 includes or has associated therewith a mail transport agent 202 that stores an inbound e-mail 203 on a local file system 204 and delivers it to an end user's e-mail client application 206. An agent 202 typically provides the basic functionality of logging in an e-mail message and copying that message to a client machine's mail spool 208. According to the present invention, the e-mail server includes an anti-spamming agent 210 for restricting delivery of bulk, unsolicited e-mail or "spam." Although FIG. 2 illustrates the anti-spamming agent 210 as being separate from the mail transport agent, this is not a requirement of the invention. The anti-spamming agent may comprise a layer of the mail transport agent or be otherwise integrated therewith.

The anti-spamming agent 210 comprises a set of routines and data structures. The agent 210 includes a set of lists 212a–n, each comprising addresses that have been "approved" for a particular e-mail client. Thus, for purposes of illustration, each e-mail client has an associated list of approved addresses. An address is said to be "approved" if either of two (2) conditions are met: (a) it represents the address of an outbound email, i.e. the address of the recipient of an e-mail generated by the user of the e-mail client, or (b) it represents a sending address which, although originally unrecognized, has been verified through a return acknowledgement according to the present invention. In particular, when an inbound e-mail is received at the e-mail server from a sending address that has not been seen before, it is classified (by default) as "spam" e-mail. As such, the e-mail is placed in a holding queue 214 associated with the e-mail queue until is can be verified as legitimate (as opposed to spam). Preferably, each e-mail client also has its own associated holding queue 214, although one of ordinary skill will appreciate that the lists 212a–n and holding queues 214a–n may comprise shared memory.

To verify the authenticity of an unrecognized sending address, the agent includes a number of code sets. Each code set comprises one or more computer instructions. Code set 216 is responsive to receipt of an e-mail (for a given recipient) for determining whether the sending address of the e-mail is on the recipient's given list of approved addresses. Code set 218 is responsive to a negative determination for issuing an e-mail 215 to the sending address requesting a return acknowledgement. The e-mail 215 may (but need not) include an authorization code 217 that must be included in any return acknowledgement for the return to be considered authentic. Code 220 directs the e-mail to the e-mail client's associated holding queue 214 pending receipt of the return acknowledgement. Code 222 releases the e-mail to the intended recipient if a return acknowledgement is received with a given time period, which may be user-selected. Code 224 flushes the e-mail from the holding queue 214 if a return acknowledgement is not received within the given time period, which reflects that the e-mail is more than likely spam. Finally, code 226 adds the sending address to the list of approved addresses for the e-mail client once the sending address has been verified. Of course, one or more of the functions provided by the code sets may be integrated into a single program, process or application. A particularly useful implementation of the code sets is a Java servlet. An instance of the servlet may be spawned for handling e-mail directed to a particular e-mail client 206.

In a preferred embodiment, once an unrecognized sending address has been added to the list of approved addresses for a given e-mail client, the address is added to each of the other lists of approved addresses (for the other e-mail clients). In addition, if desired, all of the other lists of addresses can be updated to reflect that any sending address that originates from the same domain will also be accepted without further verification. All of these options, preferably, are configurable, as will be seen.

Thus, according to the invention, a method of screening e-mail is provided in which incoming e-mail addresses are compared to an approved list and addresses not on the list are forwarded a reply, i.e. a request for acknowledgement. A favorable response to the forwarded reply determines whether or not the original e-mail is then delivered to the intended recipient. By default, all unrecognized inbound messages preferably are considered spam unless proven otherwise. The present invention effectively filters junk e-mail in an enterprise computing environment because users tend to send and receive e-mail from the same people or organizations.

Figure 3:
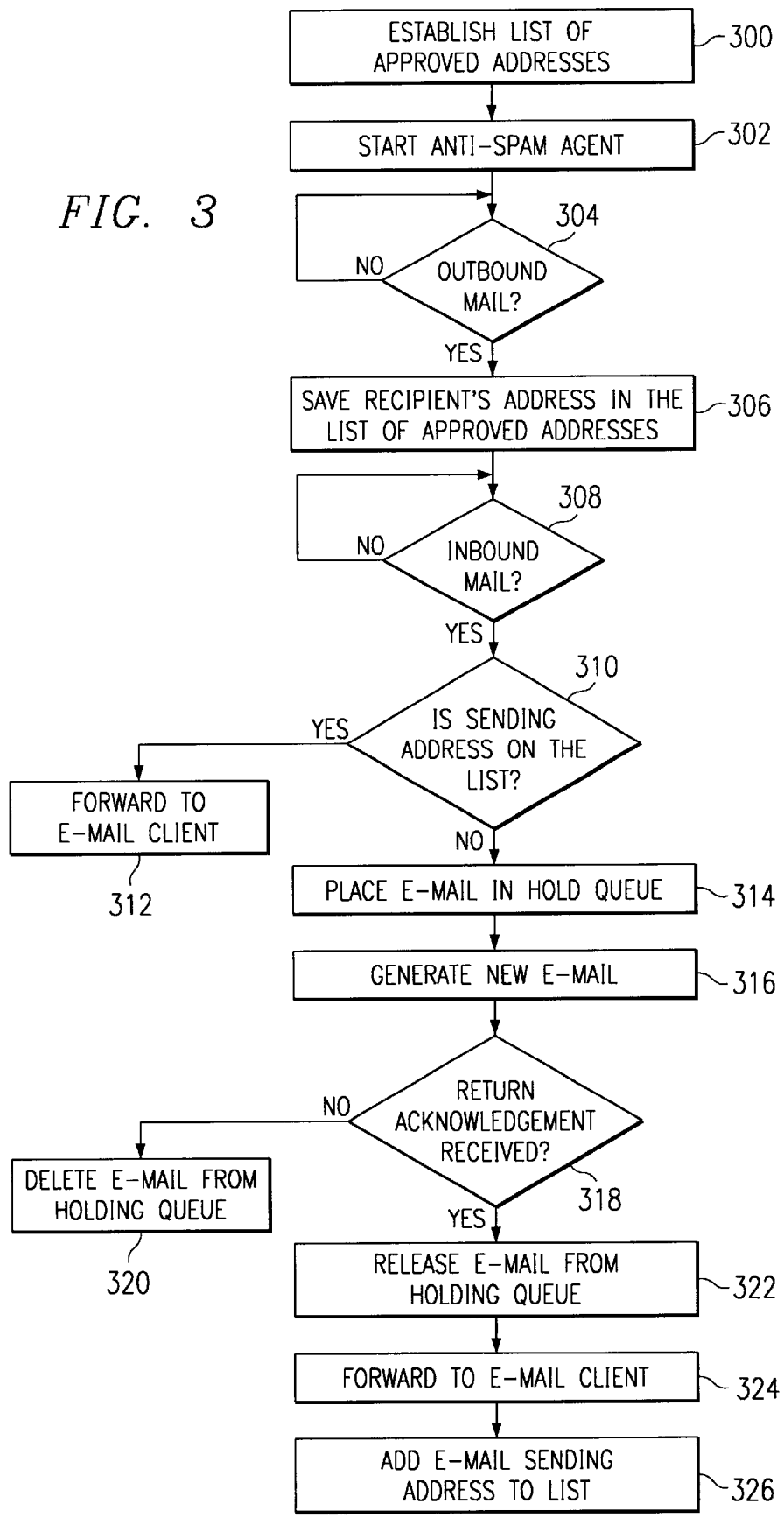
FIG. 3 is a flowchart illustrating an embodiment of the present invention.

FIG. 3 is a flowchart of a preferred method for blocking electronic mail according to the present invention. The routine begins at step 300 with the system administrator or other user establishing a list of approved addresses for each e-mail client. An individual list may be empty when initialized. As described above, these lists may be a composite list. The following describes the function for a particular e-mail client, although one of ordinary skill will appreciate that the same functionality is provided concurrently for all open e-mail clients. At step 302, the anti-spamming agent (or an instance thereof) is started for the e-mail client. Typically, step 302 occurs when the e-mail client itself is launched, although this is not a requirement. At step 304, the agent tests to determine whether any outbound mail has been generated. If not, the routine cycles. If, however, an outbound mail is generated from the e-mail client, the routine branches to step 306 and saves the recipient's address in the list of approved addresses. This operation is used because, typically, an address identified by the user will not be a spam address if the address is later seen by the agent. This step, however, is optional, as certain outbound e-mail may not be directed to known or approved users.

The routine continues at step 308 to test whether an inbound message for the e-mail client has been received at the e-mail server. Steps 304 and 308, of course, may occur in any order or concurrently. If the outcome of the test at step 308 is negative, the routine cycles. Upon a positive outcome, however, a test is performed at step 310 to determine whether a sending address of an inbound e-mail is on the list of approved addresses for the e-mail client. If the outcome of the test at step 310 is positive, the routine branches to step 312 and forwards the e-mail to the e-mail client's mail spool. If, however, the outcome of the test at step 310 is negative, which indicates that the sending or originating address of the inbound e-mail is not recognized on the list of approved addresses, the routine deems the e-mail to be unsolicited. Thus, the routine continues at step 314 to place the unsolicited e-mail in the holding queue associated with e-mail client.

At step 316, the routine generates and issues to the sending address a new e-mail requesting a return acknowledgement. Steps 314 and 316, of course, may take place concurrently or in any order. The new e-mail that is issued from the agent may include an authorization code that must be included in the return acknowledgement before the original e-mail is accepted (i.e. released from the holding queue) and delivered to the intended recipient. The use of an authorization code, however, is not required. By issuing an e-mail to the sending address of the unsolicited e-mail, the agent tests to determine whether the originator of this e-mail message will or can validate itself to the e-mail server. In this way, unsolicited e-mail can be effectively screened and blocked before it is delivered to the e-mail client. To this end, the routine continues at step 318 to test whether or not a return acknowledgement has been received within a given time period. The time limit may be set by default or by a system administrator or other user. If the outcome of the test is negative, the routine branches to step 320 and deletes the e-mail from the holding queue. In this case, the e-mail is not forwarded to the e-mail client because the agent has determined that the default spam status has not been changed within the given time period. If, however, the outcome of the test at step 318 is positive, which indicates that a return acknowledgement (possibly including the authorization code) has been received, the routine continues at step 322 to release the e-mail from the holding queue. At step 324, the e-mail is forwarded to the e-mail client's mail spool for delivery to the user's inbox. At step 326, the sending address, which has now been verified as acceptable, is added the user's list of approved addresses. As described above, this address may also be added to the lists of approved addresses for the other e-mail clients in the enterprise if desired. This completes the processing.

One of ordinary skill will recognize that the present invention provides many advantages over the prior art. The technique is simple to implement and manage, and there is no requirement for the end user to interact with the e-mail server or to otherwise be involved with the filtering process. The system administrator or other system user need only establish the list of approved addresses and then, if desired, set the time limit during which the agent will wait for a return acknowledgement before deleting a suspect e-mail from a user's holding queue.

Most spam comes from forged e-mail addresses, making return contact impossible. As a result, the inventive method ensures that e-mails originating from such addresses do not get added to any approved list.

Figure 4:
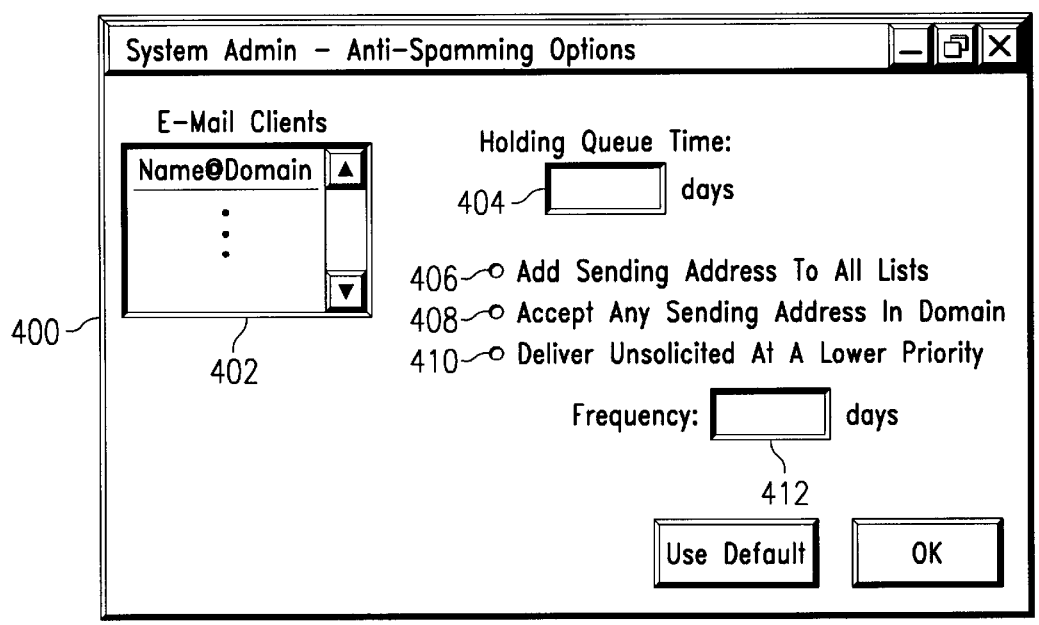
FIG. 4 is a representative administrative dialog for use in enabling an administrator to establish criteria for managing unsolicited e-mails according to the present invention.

FIG. 4 illustrates a representative dialog that may be used by a system administrator or other user to set various control options for the anti-spamming agent. This dialog is optional, however, as default settings for the agent may be used as well. A representative default setting is that any e-mail sent to a holding queue is saved for a period of one day; after that time period, the e-mail is automatically flushed from the queue if a return acknowledgement has not been received (or if the e-mail has not been released due to some other reason, e.g., another e-mail client has approved the sending address and the system is defaulted to release all e-mail having a sending address approved by any e-mail client). The dialog 400 includes a listbox 402 identifying each of the e-mail clients. Using a fill-in box 404, the administrator can identify a time period during which a given e-mail will remain in a e-mail client's holding queue. A radio button 406 is checked if the sending address of an e-mail that has been released from a given holding queue is added to the list of approved addresses for each e-mail client. If this button is not checked, only the approved address list for the e-mail client is updated. A radio button 408 is checked if the system administrator desires to accept any e-mail from a sending address originating from the same domain as an approved address. A radio button 410 is checked if the system administrator desires to move the unsolicited e-mail to a lower delivery priority as opposed to deleting the e-mail from a given holding queue. Thus, for example, if the administrator sets the option, he or she may fill-in box 412 to identify the frequency of delivery of this lower priority mail. Typically, however, button 410 is unchecked so that the spam can be deleted, not merely delayed.

The dialog illustrated in FIG. 4, of course, is merely representative. Any convenient graphical controls may be used to facilitate the user configuration desired by the system administrator. In addition, one of ordinary skill in the art will recognize that the dialog may be used to define the nature of the response that is required of the person/machine at the sending address. As noted above, the e-mail may include an acknowledgement code that has to be entered with the return acknowledgement for the reply to be acceptable. If desired, the system administrator may use the dialog screen to create or define more difficult tasks (e.g., checking a box, drawing a line, etc.) that will have to be performed before the return acknowledgement is accepted and the original sending address added to the approved address list. The goal, of course, is to issue an e-mail that requires a human response and/or to make it very difficult for an automated spam machine to respond correctly. In addition, the system administrator might use the dialog to include a warning in the e-mail to the effect that unless a return acknowledgement is received within a given time period (e.g., as set by fill-in box 404), the original e-mail will not be delivered. The dialog may also include appropriate fields and controls to allow the administrator or other user to add addresses to a user's approved address list.

As is well-known, many e-mail servers support the concept of a local delivery agent that analyzes inbound mail and determines how such mail is to be delivered to the local user's mail spool. Thus, for example, a conventional mail server is a Unix-based computer running open source Sendmail in association with a local delivery agent application. The present invention may be implemented as a replacement for or as a supplement to the local delivery agent in such environments and thus does not require replacement of the existing e-mail server.

In an illustrative embodiment as described, the inventive anti-spamming agent is implemented as a Java servlet or application; alternatively, the agent may be implemented as an applet, native code, or code implemented within an existing application (e.g., the mail transport agent). A further variation is to incorporate the inventive functionality in the e-mail client itself, or in a program associated therewith. In particular, it may be desirable to allow interaction with the user of the e-mail client under certain circumstances. Thus, for example, it may be desired to include a user interface, a pop-up dialog, that provides an message to the user that he or she has received an e-mail from an address that he or she has not previously approved. The user can then be asked to read the note and provide some indication that the material therein is acceptable, in which case the sending address might then be added to the approved address list.

More generally, preferably each of the processes described above is a set of instructions or code that together comprise a computer program. This program is executable in a processor running a given operating system. The set of instructions (program code) may be executed from a random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a "client" should be broadly construed to mean any computer or component thereof directly or indirectly connected or connectable in any known or later-developed manner to a computer network, such as the Internet. The term "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by letters patent is set forth in the following claims.

What is claimed is:

1. An e-mail system connectable to a computer network, comprising:
   a mail server;
   a plurality of e-mail clients connectable to the mail server, each of the plurality of e-mail clients having a list of approved addresses;
   a mail transport agent for receiving inbound e-mail from the computer network and forwarding the inbound e-mail to given e-mail clients, and for forwarding outbound e-mail from the e-mail clients to the computer network;
   an anti-spamming agent, comprising:

code responsive to receipt of an e-mail directed to one of the plurality of e-mail clients from the computer network for determining whether a sending address of the e-mail is on the list of approved addresses for the e-mail client for which the e-mail is directed;

code responsive to a determination that the e-mail is not on the list of approved addresses for issuing an e-mail to the sending address requesting a return acknowledgement;

code for directing the e-mail to a hold queue pending receipt of the return acknowledgement;

code for releasing the e-mail from the hold queue upon receipt of the return acknowledgement; and code for adding the sending address of the e-mail to the lists of approved addresses for others of the plurality of e-mail clients.

2. In an e-mail system comprising a mail server and a plurality of e-mail clients connectable to the mail server, each of the plurality of e-mail clients having a list of approved addresses, a method comprising the steps of:

receiving an e-mail directed to one of the plurality of e-mail clients;

determining whether a sending address of the e-mail is on the list of approved addresses for the e-mail client for which the e-mail is directed;

responsive to a determination that the e-mail is not on the list of approved addresses, issuing an e-mail to the sending address requesting a return acknowledgement; and after receipt of the return acknowledgment, adding the sending address of the e-mail to the list of approved addresses for the e-mail client and to the lists of approved addresses for others of the plurality of e-mail clients.

3. A computer program product in a computer useable medium, and operable with an e-mail system comprising a mail server and a plurality of e-mail clients connectable to the mail server, each of the plurality of e-mail clients having a list of approved addresses, the computer program product comprising:

means for receiving an e-mail directed to one of the plurality of e-mail clients;

means for determining whether a sending address of the e-mail is on the list of approved addresses for the e-mail client for which the e-mail is directed;

means, responsive to a determination that the e-mail is not on the list of approved addresses, for issuing an e-mail to the sending address requesting a return acknowledgement; and means for adding the sending address of the e-mail to the list of approved addresses for the e-mail client and to the lists of approved addresses for others of the plurality of e-mail clients after receipt of the return acknowledgment.

* * * * *